United States Patent [19]

Uhrovic

[11] Patent Number: 4,767,638
[45] Date of Patent: Aug. 30, 1988

[54] APPARATUS AND METHOD FOR TWISTING PASTRY DOUGH AND THE LIKE

[75] Inventor: Martin Uhrovic, Hauppauge, N.Y.

[73] Assignee: Entenmann's, Inc., Bay Shore, N.Y.

[21] Appl. No.: 78,347

[22] Filed: Jul. 28, 1987

[51] Int. Cl.$^4$ .......................... A21C 3/08; A21D 6/00
[52] U.S. Cl. .................................. 426/500; 99/450.1; 425/321; 425/372; 425/391; 426/512
[58] Field of Search .............. 426/500, 512; 99/450.1; 425/321, 335, 372, 391

[56] References Cited

U.S. PATENT DOCUMENTS

| | | | |
|---|---|---|---|
| 1,906,847 | 5/1933 | Fitzgerald | 425/372 |
| 2,881,715 | 4/1959 | Heim | 425/372 |
| 3,704,664 | 12/1972 | Fisher | 425/321 |
| 3,993,422 | 11/1976 | Riviere et al. | 425/321 |
| 4,171,197 | 10/1979 | Sato | 425/321 |

*Primary Examiner*—George Yeung
*Attorney, Agent, or Firm*—Thomas R. Savoie; Daniel J. Donovan

[57] ABSTRACT

Apparatus for twisting dough comprises juxtaposed conveyor surfaces, each comprising a plurality of laterally spaced-apart conveyor belts moveable in parallel adjacency, each belt of each conveyor surface being juxtaposed with a belt of the other conveyor surface, thus forming a plurality of laterally spaced-apart belt pairs. The juxtaposed conveyor surfaces thus form a conveying passageway. A belt in a belt pair moves at a higher speed than the other belt in that pair, and the speed of the two belts is such that a substantially cylindrical object disposed across adjacent belt pairs is rolled between the adjacent belt pairs as it is being conveyed along the passageway. The speed of the individual belts of the adjacent belt pairs is such that the net velocity along the passageway imparted to the object is the same at each of the belt pairs, but is also such that a greater rotational speed is imparted at one belt pair relative to that at the adjacent belt pair. Therefore, as the object is moved through the passageway, it is twisted without being canted.

13 Claims, 3 Drawing Sheets

APPARATUS AND METHOD FOR TWISTING PASTRY DOUGH AND THE LIKE

FIELD OF THE INVENTION

The present invention relates to apparatus and methods for twisting an object. More particularly, the invention relates to apparatus and method for twisting pastry and bread dough. Even more particularly, the invention relates to apparatus and method for twisting soft Danish pastry dough.

BACKGROUND OF THE INVENTION

The twisting of a soft Danish pastry dough into what is known as a "spiral twist" is a relatively difficult task. Existing procedures for twisting the dough involve time consuming manual work or the use of equipment which subjects the soft dough to rather harsh treatment which requires the use of a substantial amount of dusting powder and which results in a substantial amount of waste material. Accordingly, there is a need to provide apparatus and methods capable of twisting dough and the like in a manner which avoids the disadvantages mentioned above.

BRIEF SUMMARY OF THE INVENTION

In accordance with the present invention there is provided apparatus for imparting twist to an elongate object comprising:

Apparatus for imparting twist to an elongate object comprising:

first conveyor means comprising a first set of conveyor belts, the conveyor belts of said first set being disposed such that portions of the belts move in laterally spaced-apart parallel adjacency, said belts portions together forming a first conveying surface;

second conveyor means comprising a second set of conveyor belts, the conveyor belts of said second set being disposed such that portions of the belts move in laterally spaced-apart parallel adjacency, said belts portions together forming a second conveying surface;

means for mounting said first and second conveyor means such that said first and second conveyor surfaces are substantially parallel to one another and in juxtaposition whereby an object-conveying passageway is formed between the juxtaposed first and second conveyor surfaces, said passageway having an inlet end for introducing an object into said passageway and a discharge end for discharging an object from said passageway;

means for mounting said first and second sets of belts such that each belt of said first set of belts is in juxtaposition with a respective belt of said second set of belts, whereby a plurality of pairs of belts is formed, each pair of belts comprising a belt of said first set of belts and a respective juxtaposed belt of said second set of belts;

belt moving means for: (1) moving a first belt in said first set of belts at a relatively higher velocity than that of a further, adjacent, belt in said first set of belts; (2) moving a first belt in said second set of belts at a relatively higher velocity than that of a further, adjacent, belt in said second set of belts, said first belt of said first set of belts being in juxtaposition with said further belt of said second set of belts and forming therewith a first pair of belts, said first belt of said second set of belts being in juxtaposition with said further belt of said first set of belts and forming therewith a second pair of belts; and (3) moving each of the belts of each of said first and second pairs of belts at a velocity such that the net velocity of an object conveyed through said passageway is the same at each pair of belts;

whereby an elongate object oriented with its longitudinal axis transverse to a direction extending from said inlet end to said discharge end of said passageway and introduced into said inlet end of said passageaway, is subjected to twisting as it conveyed in said direction through said passageway by being rolled between the belts of at least one of said first and second pairs of belts, the extent of said twisting being dependent on the difference in speed of the belts in each of said first and second pairs of belts and on the difference in speed between said first and further, adjacent, belts in each set of belts, and whereby said twisting is effected without causing canting of said object.

Further in accordance with the invention there is provided a method for twisting an elongate object, such as pastry or bread dough, which comprises moving through the passageway of the apparatus described above an elongate object oriented transverse to the conveying direction of the apparatus whereby the object is twisted without being canted.

DETAILED DESCRIPTION OF PREFERRED EMBODIMENT

There follows a detailed description of preferred embodiments of the invention including the drawings in which.

Figure 1:
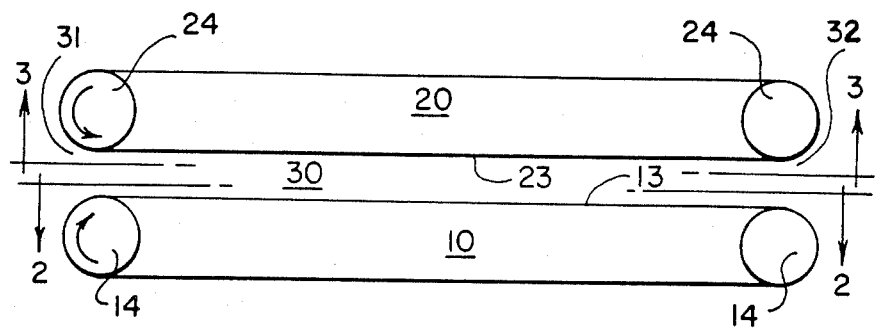
FIG. 1 is a diagrammatic side elevation view of twisting apparatus according to the invention.
Figure 2:
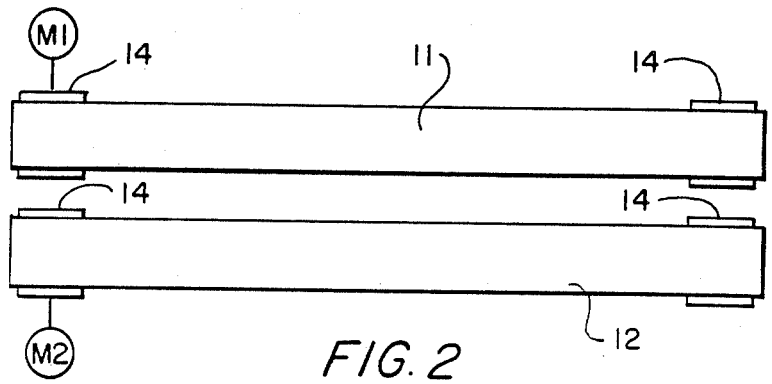
FIG. 2 is a diagrammatic top plan view of the lower portion of the appartus of FIG. 1, taken generally in the direction of line 2—2.
Figure 3:
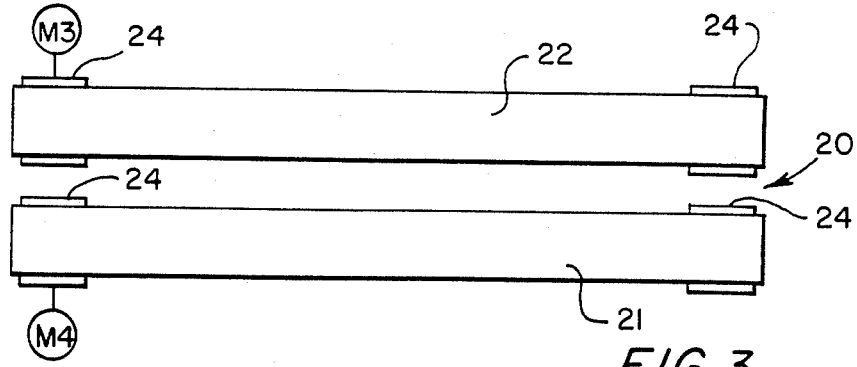
FIG. 3 is a diagrammatic bottom plan view of the upper portion of the apparatus of FIG. 1, taken generally in the direction of line 3—3.
Figure 4:
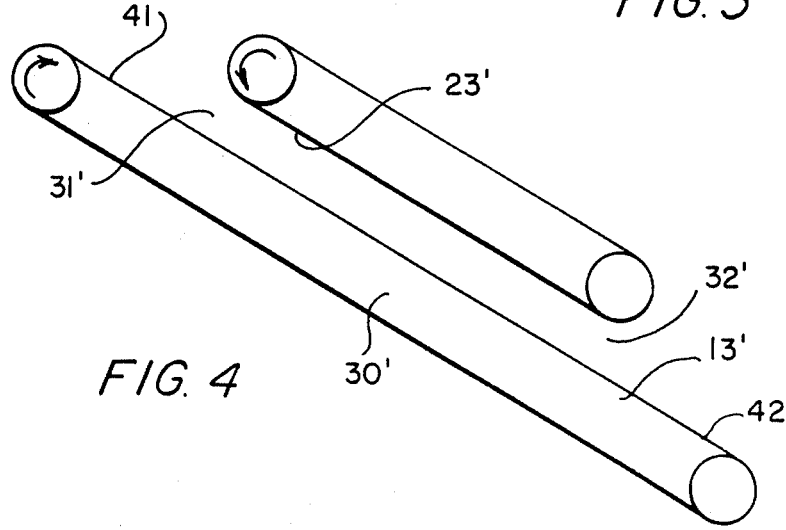
FIG. 4 is a diagrammatic side elevation view of a second embodiment of apparatus according to the invention.

As shown in FIGS. 1–3, apparatus according to the present invention comprises first conveyor means 10 comprising a first set of adjacent, laterally spaced-apart conveyor belts 11,12 forming a first conveyor surface 13 and second conveyor means 20 comprising a second set of adjacent, laterally spaced-apart conveyor belts 21,22 forming a second conveyor surface 23. Conveyor means 10 and 20 are mounted in fixed position by any suitable frame or other mounting means not shown in FIG. 1–3 for clarity. The conveyors are mounted in fixed position such that, as shown, first and second conveyor surfaces 13 and 23 are substantially parallel to one another and in juxtaposition, thus forming an object-conveying passageway 30 between the juxtaposed conveyor surfaces. Passageway 30 has an inlet end 31 for introducing an object into the passageway and a discharge end 32 for discharging an object from the passageway. In FIGS. 1-3, conveyor means 10 and 20 are shown with conveying surfaces 13 and 23 disposed horizontally. However, it is to be understood that while the conveyor surfaces may be disposed horizontally, they need not be. In some instances, it is preferred that the conveyor surfaces are inclined as shown in FIG. 4. For example, an inclined surface often facilitates introducing objects into and/or discharging objects from passageway 30. A vertical arrangement is also possible and might be desirable in certain instances such as where floor space is limited. Conveyor surfaces 13 and 23, as illustrated, are in flat planes and this is preferred in many instances because of relative simplicity and low cost. However, it is only required that the opposed belts of the conveyor surfaces are juxtaposed and parallel to one another, that is, equidistant along passageway 30. Accordingly, conveyor surfaces 13 and 23 may be curved. Moreover, depending on the cross-sectional configuration of the object being twisted, the space between a pair of juxtaposed belts may be different than the space between a further pair of belts. Of course if the object has a uniform cross section along its length, such as a cylindrical object, the spacing between the various belt pairs will normally be the same.

As shown in FIGS. 1-3, conveyor surfaces 13 and 23 are mirror images of one another and identical in size. However, it is only required that the two conveyor surfaces together form passageway 30 and it is often convenient for the two conveyor surfaces to be of different size, particularly with respect to length. It is particularly convenient where one conveyor surface is located below another, to have the lower conveyor surface longer, in the conveying direction, than the upper conveyor surface to facilitate introduction of an object into and/or discharge of an object from, the conveyor passage. This is illustrated in FIG. 4 wherein a lower conveyor surface 13' is longer than upper conveyor surface 23' and includes an inlet area 41 adjacent the inlet end 31' of passageway 30' and a discharge area 42 adjacent the outlet end 31' of passageway 30'.

Again referring to FIGS. 1-3, the first set, in this case the lower set, of belts is mounted on rollers 14, and the second, upper, set of belts is mounted on rollers 24. Rollers 14 and 24 are mounted such that each of the belts 11,12 of the first set is in juxtaposition with a respective belt 21,22 of the second set, thus forming a plurality of pair of belts, namely a first pair 11,21 and a second pair 22,12, each pair of belts comprising a belt of the first set and a respective juxtaposed belt of the second set.

The apparatus includes means, such as motors M1, M2 for moving first belt 11 in the first set of belts at a relatively higher velocity than that of the further adjacent belt 12 in the first set of belts, and means such as motors M3 and M4 for moving first belt 22 in the second set of belts at a relatively higher velocity than that of the further adjacent belt 21 in the second set of belts. First belt 11 of the first set of belts is thus in juxtaposition with the further belt 21 of the second set and forms therewith first pair of belts 11,21, and first belt 22 of the second set of belts is thus in juxtaposition with the further belt 12 of the first set and forms therewith second pair of belts 22,12.

The apparatus further comprises means, such as conventional controllers (not shown) for controlling the rotational speeds of motors M1-M4 for moving the belts of each of the first and second pairs at linear velocities such that the net velocity of a substantially cylindrical object conveyed by being rolled between the first and second pairs of belts through passageway 30 is the same.

It will be apparent that if an elongate object is introduced into passageway 30 such that its longitudinal axis is transverse to the conveying direction (i.e., the longitudinal direction of the conveying belts) and if it is conveyed through the passageway by virtue of its rolling contact with parallel pairs of upper and lower belts such as shown in FIGS. 1-3, the object will remain in its initial transverse orientation only if the velocity imparted to the object at each pair of the belts is the same. If the velocity of the object along the passageway at each pair of belts is not the same, the object will become canted as it is moved through the passageway. Canting of the object will result from any difference in velocity along the passageway imparted by any two adjacent belt pairs, and the extent of canting will depend on the extent of that difference. Canting will subject the object to stretching and distortion, both of which can cause difficulties such as uncontrollable product deformation, breakage and waste, and difficulties in handling the product, particularly as it is discharged from the twisting apparatus. These problems are particularly acute with relatively fragile products, such as dough, parcticularly soft pastry dough.

The present invention avoids the foregoing difficulties in that in the present invention, the object being twisted is not canted. Thus, an elongate object, such as a strand of soft pastry dough, can be introduced into the passageway in a particular orientation transverse to the conveying direction an will retain that orientation as it is being twisted during its motion through the passageway. Thus, the twisted product which emerges from the discharge end of the passageway can be twisted in any desired manner while it is held in any desired orientation transverse to the conveying direction. Elimination of canting during passage through the twist-imparting passageway thus avoids the difficulties mentioned above. The term "canting" as used herein thus means deviation in the orientation of the elongate object, relative to the conveying surfaces, from its initial transverse orientation at the inlet end of the passageway. By "transverse" is meant that the elongate object is disposed across a plurality of pairs of conveyor belts. In most instances, the elongate object will be oriented with its longitudinal axis disposed substantially at a right angle to the conveying direction and it is preferred that its orientation is within 5 or 10 of such right angle. However, there may be situations where it is desired to orient the product differently, such as where product handling is facilitated if the twisted product is discharged such that one end emerges from the twist-imparting passageway before the other, and the term "transverse" is used herein in the sense mentioned above to include such orientation.

It should also be mentioned that the invention has particular utility in twisting soft products such as a soft pastry dough. Products of this type are not stiff and will easily droop. Accordingly, it is contemplated that such products will not be straight when introduced into the twist-imparting passageway. However, it is a feature of the invention that the object will be conveyed at equal velocity at each belt pair in the passageway even if the product is not straight. Accordingly, while it is preferred that the object is substantially straight as it enters the twist-imparting passageway, it is an advantage of the invention that it need not be so and the terms "cylindrical", "transverse", and "canted" as used herein are not to be construed as an implication that the object being twisted is straight while it is undergoing twisting.

The object undergoing twisting is elongate and substantially circular in cross section as it is being rolled at each belt pair. However, as mentioned above, the invention is particularly applicable to soft dough and similar materials which will adopt a substantially circular cross section when rolled but which may not be circular in cross section before being rolled. The elongate object may be of substantially uniform cross section along its length, but need not be. As mentioned above, the conveyor surfaces forming passageway 30 need not be equidistant fully across the passageway in order to accommodate an object which is not uniform in cross section along its length.

In an embodiment preferred for simplicity, belts 11 and 22 are moved at the same, relatively high, linear velocity, and belts 12 and 21 are driven at the same, relatively low linear velocity. Thus, the first pair of belts comprises high velocity belt 11 juxtaposed below low velocity belt 21 and the second pair of belts comprises high velocity belt 22 juxtaposed above low velocity belt 12.

Figure 5:
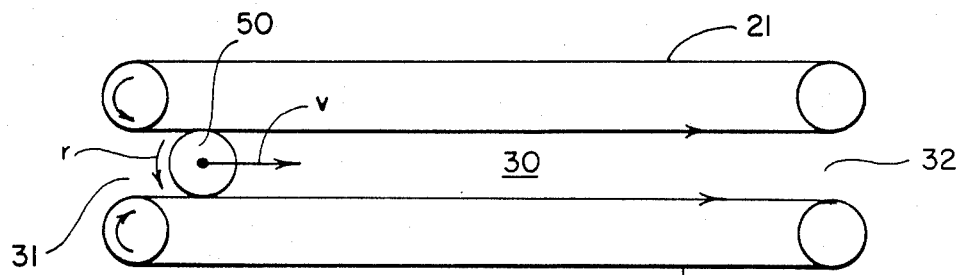
FIGS. 5 and 6 are diagrammatic side elevation views of portions of the apparatus of FIGS. 1–3.

When a cylindrical object 50 (see FIG. 5) such as an elongate strand of dough, is inserted into passageway 30 such that its cylindrical axis is substantially transverse to the conveying direction, it is simultaneously subjected to a conveying velocity to the right in the sense of FIG. 1. This is illustrated in FIG. 5 in connection with a single pair of belts, namely high speed belt 11 and low speed belt 21. Because both belts 11, 21 move to the right in the sense of FIG. 1, the dough strand is conveyed along passageway in the conveying direction from inlet end 31 to discharge end 32, to the right in the sense of FIG. 5. The velocity (v) of the dough along conveying passageway 30 is dependent on the velocities of the conveyor surfaces 11 and 21. In addition to being moved along passageway 30, the dough is also subjected to a rolling motion (r), the extent of which depends on the difference in speed between belts 11 and 21. Since belt 11 moves more rapidly than belt 21, the rolling motion imparted at this pair of belts is counterclockwise as shown in FIG. 5.

Figure 6:
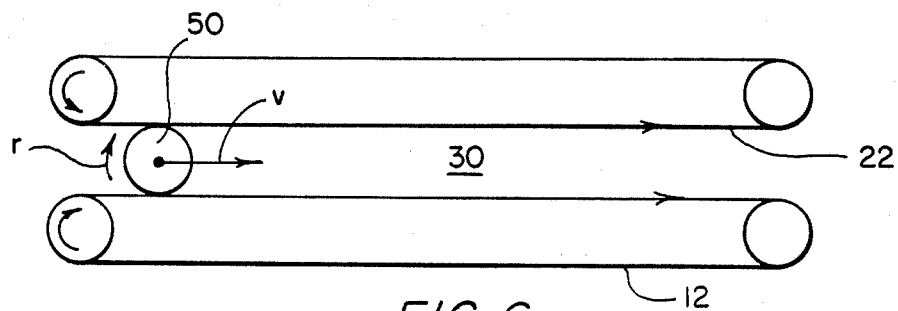

As mentioned above, FIG. 5 depicts the linear motion v and rotational motion r of object 50 as it is conveyed between the first pair of belts 11, 21. While the diagram is representative of the motion of the object between any pair of belts, it will be readily apparent that the values of linear and rotational motion of the object at any particular pair of belts will depend on the values of the linear motion of the belts of the respective pair of belts. For example, each of the belts 22,12 of the second pair of belts shown in FIG. 1 move to the right at the same linear speed respectively as the belts 11,21 of the first pair of belts, but the relatively faster belt 22 is on top whereas the relatively slower belt 12 is on the bottom, as depicted in FIG. 6. Recalling that belts 11 and 22 move at the same, higher speed and that belts 12 and 21 move at the same slower, speed, it will be apparent that the sum of the speed of belts 12 and 22 is the same as the sum of the speed of belts 11 and 21. Accordingly, the velocity v of object 50 along the passageway 30 between belts 12 and 22 is the same as the velocity v of object 50 along the passageway 30 between belts 11 and 21. However, since in FIG. 6 the more rapidly moving belt is on top, rotation r of object 50 is clockwise whereas in FIG. 5 it is counterclockwise. Thus, the first pair of belts imparts counterclockwise rotation r and forward velocity v while the second, adjacent, pair of belts imparts clockwise rotation r and the same forward velocity v. It will therefore be readily apparent that the dough strand 50 is subjected to twisting along its length between the first and second pairs of belts as it is being conveyed through the passageway by being rolled between the belts of the first and second pairs of belts. It will be apparent that the extent of twisting will depend on the difference in the extent of rolling imparted by adjacent pairs of belts. The extent of rolling at a particular pair of belts is dependent on the difference in the speeds of the belts in that pair of belts. The differences in rolling imparted by adjacent pairs of belts depends on the difference in speed between the first belt and the further adjacent belt in each set of belts. This latter point will be best understood with reference to FIGS. 5 and 6. Belt 11 in the lower set of belts 11,12 moves more rapidly whereas adjacent lower belt 12 moves more slowly. If the speed of the lower belt 11 were decreased and the speed of upper belt 21 were increased, while keeping the sums of those speeds the same, the amount of counterclockwise rotation imparted by belts 11 and 21 would decrease while the velocity v would remain the same. Accordingly, the amount of twisting of the object in the space between the first and second pairs of belts would be decreased. As an example, assume that the sum of the velocities of the belts of the second pair of belts (FIG. 6) is 10 cm/sec, in which case the velocity v in FIG. 6 would be 5 cm/sec. Assume further that the relative speeds of belts 12 and 22 and the geometry of the system are such that the circular object 50 shown in FIG. 6 would be rolled four times during its travel through passageway 30. If the first pair of belts 11,21 were arranged in the same manner but with the upper and lower belt speeds reversed, the circular object shown in FIG. 5 would also be rolled four times, but in the opposite direction. Thus, if object 50 is an elongate twistable object extending across both pairs of belts, it would be subjected to eight full twists as it travelled through passageway 30. However, since it travelled at the same velocity v at each pair of belts, it would not be subjected to canting as it travelled through passageway 30. Continuing with the example, assume now that the speed of opposed belt 11 is increased such that it is equal to the speed of opposed belt 21, the sum of the speeds of belts 11,21 being kept at 10 cm/sec. The velocity v of object 50 in FIG. 5 will thus remain at 5 cm/sec but no rolling motion will be imparted at belt pair 11,21. Accordingly, only four full twists will be imparted to the dough as it is conveyed through passageway 30, again without canting.

Figure 7:
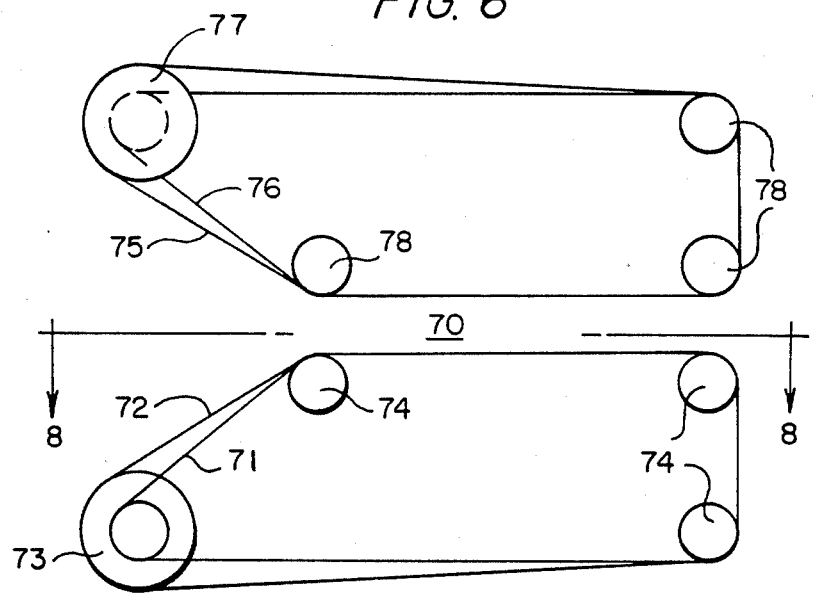
FIG. 7 is a diagrammatic side elevation view of a third embodiment of the invention.
Figure 8:
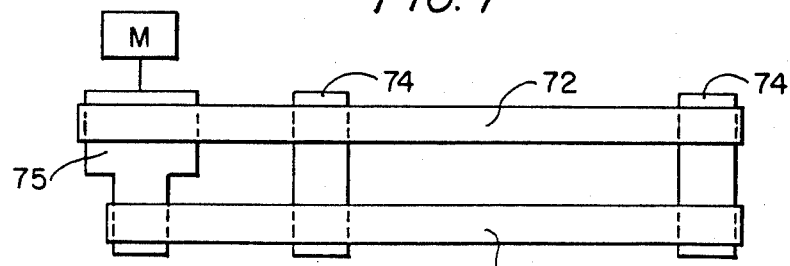
FIG. 8 is a diagrammatic top plan view of the lower portion of the apparatus of FIG. 7, taken generally in the direction of line 8—8.

In a preferred embodiment, the conveyor belts of each set ar commonly driven. A suitable arrangement is illustrated in FIGS. 7 and 8 in which the lower set of belts 71,72 is driven by a common drive roller 73 powered by motor M. Each of the belts passes over common idler rollers 74. The uppe set of belts 75,76 is similarly arranged with a common drive roller 77 powered by a motor not shown for clarity (but which may be motor m) and passed over common idler rollers 78. The upper and lower sets of belts form a passageway 70 which may be the same in all other respects as passageway 30 of FIGS. 1-6. Drive roller 73 is stepped as shown such that belt 71 is driven at a slower speed than belt 72. Drive roller 77 is stepped the same as drive roller 73 and is driven at the same rotational speed. Belt 76 is thus driven at the same, slower speed as belt 71 and belt 75 is driven at the same higher, speed as belt 72. At passageway 70, high speed belt 72 is positioned in juxtaposition with low speed belt 76 and low speed belt 71 is positioned in juxtaposition with high speed belt 75, thus forming first and second conveyor surfaces defining passageway 70 for twisting an object in the same manner described in connection with Figures 1-6.

The width of individual belts, the spacing between the adjacent belt pairs, the number of belt pairs, and the spacing between the conveyor surfaces in passageway 30 can vary widely, depending on the nature and size of the object twisted and the nature and extent of desired twisting.

In a preferred embodiment, the apparatus is used to twist dough and for this use, the apparatus will normally include at least four, preferably at least eight conveyor belts in each set and preferably driven from a common, stepped, drive shaft similarly as in FIGS. 7 and 8, the difference between adjacent steps and the number of each steps being such as to impart a particular desired twist. It is also necessary, of course, to ensure that the sum of the velocity of the belts in each pair of belts is the same, all across the width of the passageway, in order to prevent canting of the dough as it moves through the apparatus. For this use, a suitable width of the individual belts is about $\frac{1}{4}$" to 2" and preferably about $\frac{1}{2}$" to $1\frac{1}{2}$". The belts in each pair may be the same width but need not be. The spacing between adjacent belt pairs may be uniform but need not be and, for use in twisting dough, is suitable such that the total space between adjacent belts in a set is about 10 to 90%, preferably 40 to 90%, of the surface area of the total conveyor surface of that set.

The space between the conveyor surfaces will be substantially the same as the diameter of an object being twisted and for twisting dough is suitably about $\frac{1}{2}$ to 2"

Various twisting effects can be readily achieved in accordance with the invention. Where it is desired to achieve a uniform twist along the full length of the dough, the amount of twisting, as determined by the difference in speed between juxtaposed belts in each pair, will be linear across the full width of the passageway in which case the spacing and difference in speed between any adjacent belts in each set is the same. This arrangement is depicted for a two belt system in FIGS. 7 and 8. A three-belt arrangement of this type is depicted graphically in FIG. 9.

Figure 9:
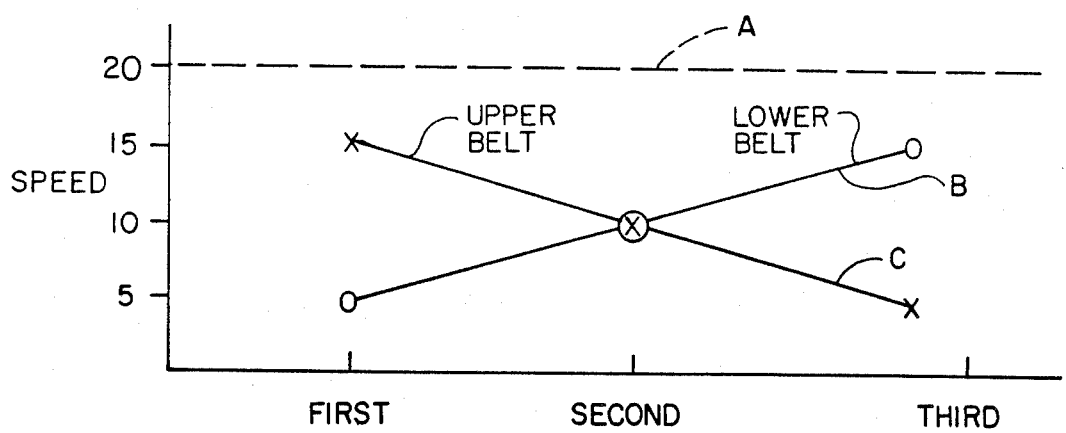
FIGS. 9 and 10 are graphical representations of the speed of belt pairs at various positions in apparatus according to the invention.

In the system illustrated graphically in FIG. 9, the lower belts and the juxtaposed upper belts are provided equally spaced across the device. The sum of the velocities of the belts in each pair is the same as indicated by dashed horizontal line A. Thus, the object is not subjected to canting as discussed above. The speed of the three lower belts increases uniformly, linearly, and incrementally from left to right, and the speed of the upper belts does the same, but from right to left. Thus, lower belt speeds are represented by straight line B and the upper belt speeds are represented by straight line C. The difference in velocity between the upper and lower belts of any one pair of belts — which difference will account for the extent and direction of imparted rotation — is indicated by the vertical difference between lines C and B. Thus, with reference to FIG. 9, and assuming arbitrary speed units, the difference in speed at the first pair of belts is 10, with the lower belt slower.

Thus, in the sense of FIGS. 5 and 6, clockwise rotation would be imparted at the first belt pair. The belts of the second pair of belts move at the same speed and thus no rotation will be imparted at the second belt pair. The difference in speed at the third belt pair is again 10, but the lower belt moves more rapidly. Accordingly, rotation will be counterclockwise. The total amount of twist imparted will therefore be dependent on the sum of the clockwise rotation between the first and second belt pairs and the counterclockwise rotation between the second and third belt pairs.

Figure 10:
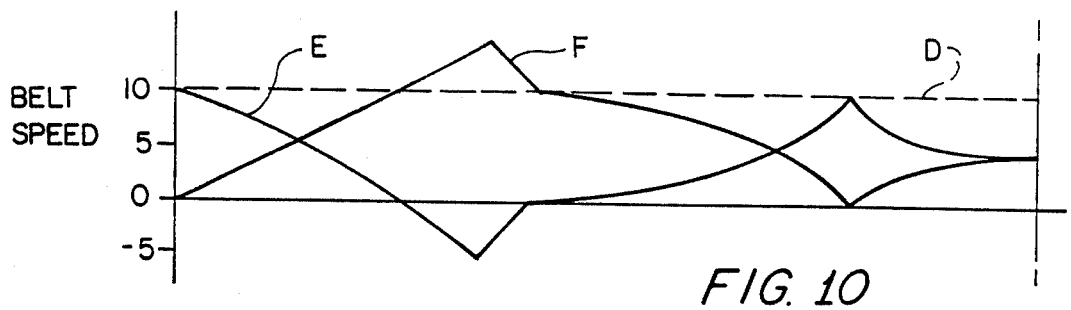

It will be apparent from FIG. 9 that a graphical diagram such as FIG. 9 can be used to depict various belt speeds suitable for the present invention, it being only necessary to understand that line B represents possible speed of the belts in one set and that line C represents possible belt speeds in the other set. For example, one can draw vertical lines in FIG. 9 at any location across the abscissa and by doing so determine the belt speeds and location across the apparatus for each pair of belts, and obtain twisting without canting according to the invention. As an example, consider FIG. 10 which shows curves E and F for, respectively, upper and lower belt speeds, the sum of which is constant as indicated by dashed line D. As shown in FIG. 10, the speed of the belts does not need to increase linearly across the apparatus. Moreover, as shown in FIG. 10, the velocity of a belt in a pair can be negative (i.e. it can move in a direction opposite to the conveying direction) provided that the sum of the velocities of that pair is the same as that of the other pairs of belts in the machine. It will thus be apparent that wide variation in twisting can be achieved according to the present invention without causing canting.

The invention has particular applicability to plastic objects and most particularly to pastry or bread dough. When used to twist dough or other relatively easily deformable material, it will be recognized that the object being twisted may not be truly circular when it is introduced or that it may not remain truly circular in cross section as it moves through the device. Moreover, as the object is twisted, it will be subjected to some thinning in cross section, particularly if the twisting is excessive. In that event, it might be appropriate to taper the passageway inwardly slightly in the conveying direction to ensure that the conveying surfaces remain in contact with the dough for a time sufficient to impart adequate twisting to the dough. Accordingly, when it is said herein that the conveying surfaces are "substantially parallel" to one another, it is contemplated that the surfaces may be tapered to the extent necessary to accommodate thinning of the material being twisted as just described.

Figure 11:
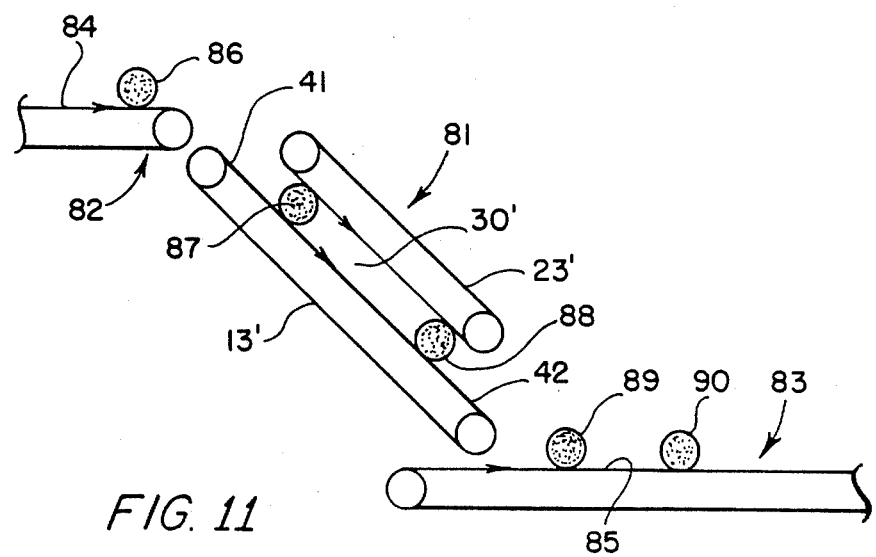
FIG. 11 is a diagrammatic side elevation view of a fourth embodiment of the invention.

FIG. 11 depicts apparatus according to the invention having three sections: a twisting section 81; an inlet conveyor section 82; and a product conveyor section 83. The twisting section can take any of the various forms of the invention as described above. Inlet conveyor section 82 comprises a conventional conveyor belt 84 for delivering a cylindrical object to the inlet area 41 of lower conveyor belt 13'. Product conveyo section 83 comprises a conventional conveyor belt 85 for conveying twisted products away from the discharge area 42 of lower conveyor belt 13'. A cylindrical object 86 ready for twisting is delivered to area 41 of belt 13' via conveyor belt 84 and the object is then twisted between belts 13' and 23' as it passes through passageway 30'. Two objects 87 and 88 are shown being twisted. The speed of conveyor belt 84 is preferably slightly less, preferably up to 5% less, than the speed at which the dough strand is conveyed through passageway 30'. The twisted product is then permitted to fall by gravity onto conveyor belt 85 where it is conveyed away for further handling. Conveyor belt 85 preferably moves at least slightly faster than the speed of the dough through passageway 30'. Two twisted objects 89,90 are depicted in FIG. 11 on conveyor belt 85.

What is claimed is:

1. Apparatus for imparting twists to an elongate dough piece comprising:

first conveyor means comprising a first set of conveyor belts, the conveyor belts of said first set being disposed such that portions of the belts move in laterally spaced-apart parallel adjacency, said belts portions together forming a first conveying surface;

second conveyor means comprising a second set of conveyor belts, the conveyor belts of said second set being disposed such that portions of the belts move in laterally spaced-apart parallel adjacency, said belts portions together forming a second conveying surface;

means for mounting said first and second conveyor means such that said first and second conveyor surfaces are substantially parallel to one another and in juxtaposition whereby a dough piece-conveying passageway is formed between the juxtaposed first and second conveyor surfaces, said passageway having an inlet end for introducing an elongate dough piece into said passageway and a discharge end for discharging an elongate dough piece from said passageway;

means for mounting said first and second sets of belts such that each belt of said first set of belts is in juxtaposition with a respective belt of said second set of belts, whereby a plurality of pairs of belts is formed, each pair of belts comprising a belt of said first set of belts and a respective juxtaposed belt of said second set of belts;

belt moving means for: (1) moving a first belt in said first set of belts at a relatively higher velocity than that of a further, adjacent, belt in said first set of belts; (2) moving a first belt in said second set of belts at a relatively higher velocity than that of a further, adjacent, belt in said second set of belts, said first belt of said first set of belts being in juxtaposition with said further belt of said second set of belts and forming therewith a first pair of blets, said first belt of said second set of belts being in juxtaposition with said further belt of said first set of belts and forming therewith a second pair of belts; and (3) moving each of the belts of each of said first and second pairs of belts at a velocity such that the net velocity of a elongate dough piece conveyed through said passageway is the same at each pair of belts;

whereby an elongate dough piece oriented with its longitudinal axis transverse to a direction extending from said inlet end to said discharge end of said passageway and introduced into said inlet end of said passageway, is subjected to twisting as it conveyed in said direction through said passageway by being rolled between the belts of at least one of said first and second pairs of belts, the extent of said twisting being dependent on the difference in speed of the belts in each of said first and second pairs of belts and on the difference in speed between said first and further, adjacent, belts in each set of belts, and whereby said twisting is effected without causing canting of said dough piece.

2. Apparatus according to claim 1 wherein said first conveyor surface is positioned below said second conveyor surface.

3. Apparatus according to claim 2 wherein said first conveyor surface is longer than said second conveyor surface and extends outwardly beyond at least one end of said passageway.

4. Apparatus according to claim 1 wherein said first and second conveyor surfaces each are in a substantially flat plane.

5. Apparatus according to claim 1 wherein said first and second conveyor surfaces are inclined to the horizontal.

6. Apparatus according to claim 1 wherein the belts in each set of belts are substantially uniformly spaced across the width of said passageway.

7. Apparatus according to claim 6 wherein each of said set of belts comprises at least four belts, and wherein said belt moving means comprises means for moving each of the belts of each of said first and second sets of belts at the same uniformly incrementally increasing speed across the width of said passageway.

8. Apparatus according to claim 7 wherein said belt moving means comprises first and second stepped drive rollers for moving, respectively, said first and second sets of belts.

9. A method of imparting twist to an elongate dough piece comprising:

providing first conveyor means comprising a first set of conveyor belts, the conveyor belts of the first set being disposed such that portions of the belts move in laterally spaced-apart parallel adjacency, the belt portions together forming a first conveying surface;

providing second conveyor means comprising a second set of conveyor belts, the conveyor belts of the second set being disposed such that portions of the belts move in laterally spaced-apart parallel adjacency, the belt portions together forming a second conveying surface;

mounting the first and second conveyor means such that the first and second conveyor surfaces are substantially parallel to one another and in juxtaposition whereby a dough piece-conveying passageway is formed between the juxtaposed first and second conveyor surfaces, the passageway having an inlet end for introducing an elongate dough piece into the passageway and a discharge end for discharging an elongate dough piece from the passageway, the first and second sets of belts being mounted such that each belt of the first set of belts is in juxtaposition with a respective belt of the second set of belts, whereby a plurality of pairs of belts is formed, each pair of belts comprising a belt of the first set of belts and a respective juxtaposed belt of the second set of belts;

introducing an elongate dough piece into the inlet end of said passageway with its longitudinal axis transverse to the conveying direction such that the dough piece extends across said first and second sets of belts;

moving a first belt in the first set of belts at a relatively higher velocity than that of a further, adjacent, belt in the first set of belts;

moving a first belt in the second set of belts at a relatively higher velocity than that of a further, adjacent, belt in the second set of belts, the first belt of the first set of belts being in juxtaposition with the further belt of the second set of belts and forming therewith a first pair of belts, the first belt of the second set of belts being in juxtaposition with the further belt of the first set of belts and forming therewith a second pair of belts;

the velocity of the belts of each of the first and second pairs of belts being such that the net velocity of an elongate dough piece conveyed along said passageway is the same at each pair of belts, whereby said dough piece is twisted as it is conveyed along said passageway by being rolled between the belts of at least one of said first and second pairs of belts, the extent of the twisting being dependent on the difference in speed of the belts in each of the first and second pairs of belts and on the difference in speed between the first and further, adjacent, belts in each set of belts, and whereby the twisting is effected without causing canting of the dough piece.

10. A method according to claim 9 wherein said dough-piece comprises a strand of dough.

11. A method according to claim 10 wherein said dough comprises soft pastry dough.

12. A method according to claim 9 wherein the higher speed of the first belt in said first and second sets is the same and wherein the lower speed of the second belt is in said first and second sets is the same.

13. A method according to claim 12 wherein each set of belts comprises at least four belts and wherein the adjacent belts of each set are moved at a uniformly linearly incrementally increasing speed.

* * * * *